May 21, 1929.  L. P. CROSMAN  1,713,690
SPRING TESTING AND ASSORTING MACHINE
Filed Feb. 23, 1928  4 Sheets-Sheet 1
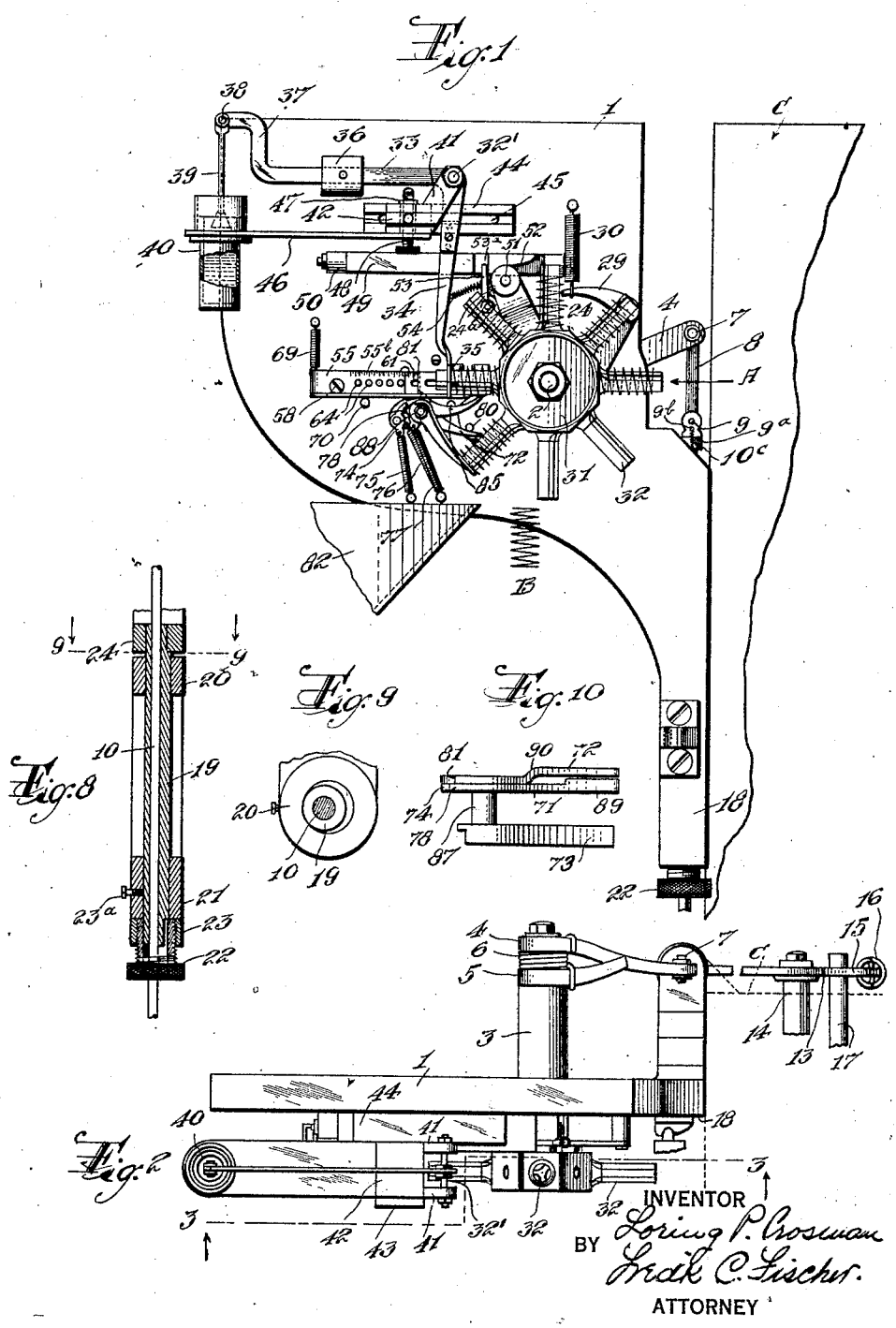
INVENTOR
Loring P. Crosman
BY Fred C. Fischer
ATTORNEY

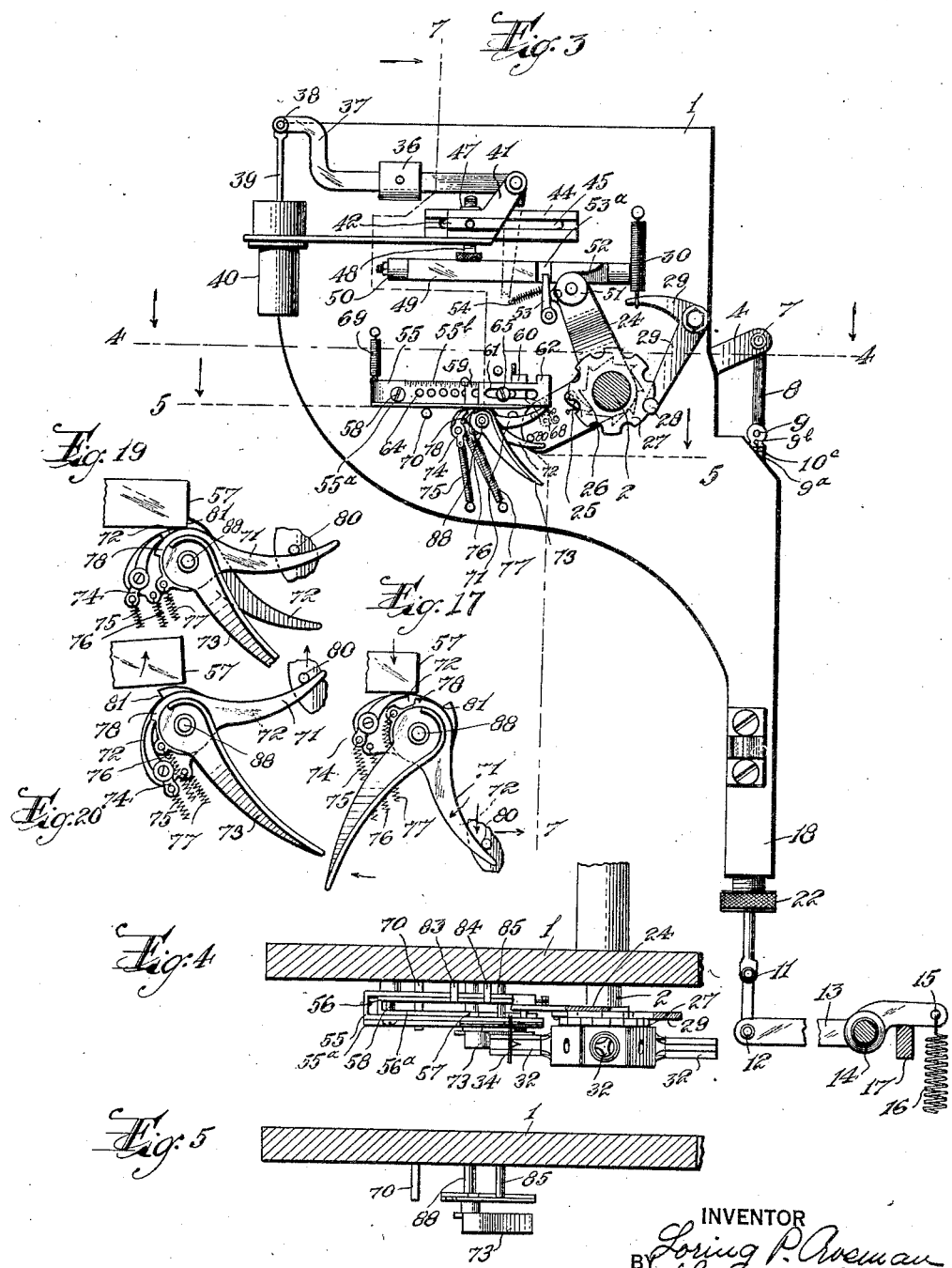

May 21, 1929.    L. P. CROSMAN    1,713,690
SPRING TESTING AND ASSORTING MACHINE
Filed Feb. 23, 1928    4 Sheets-Sheet 3
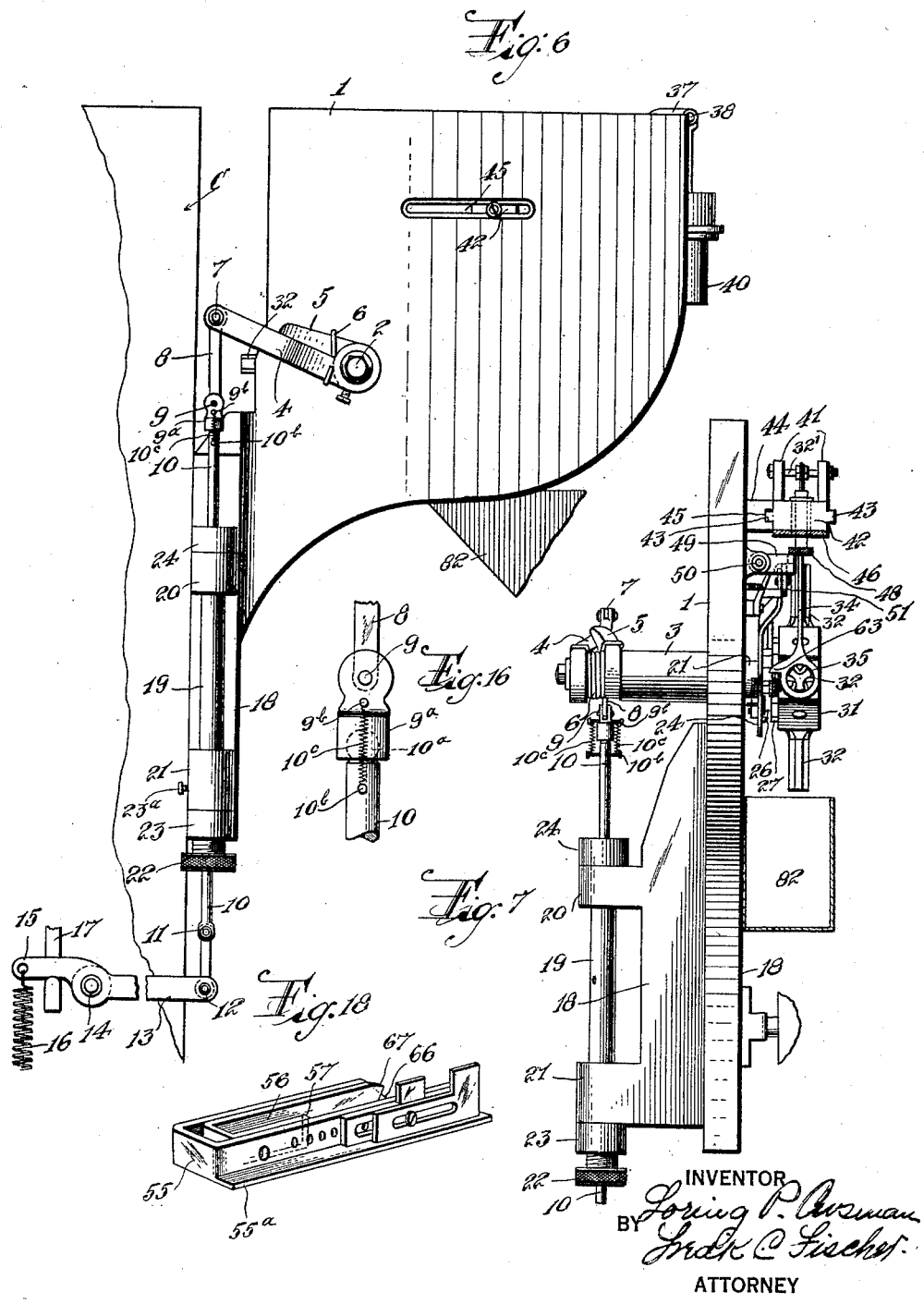

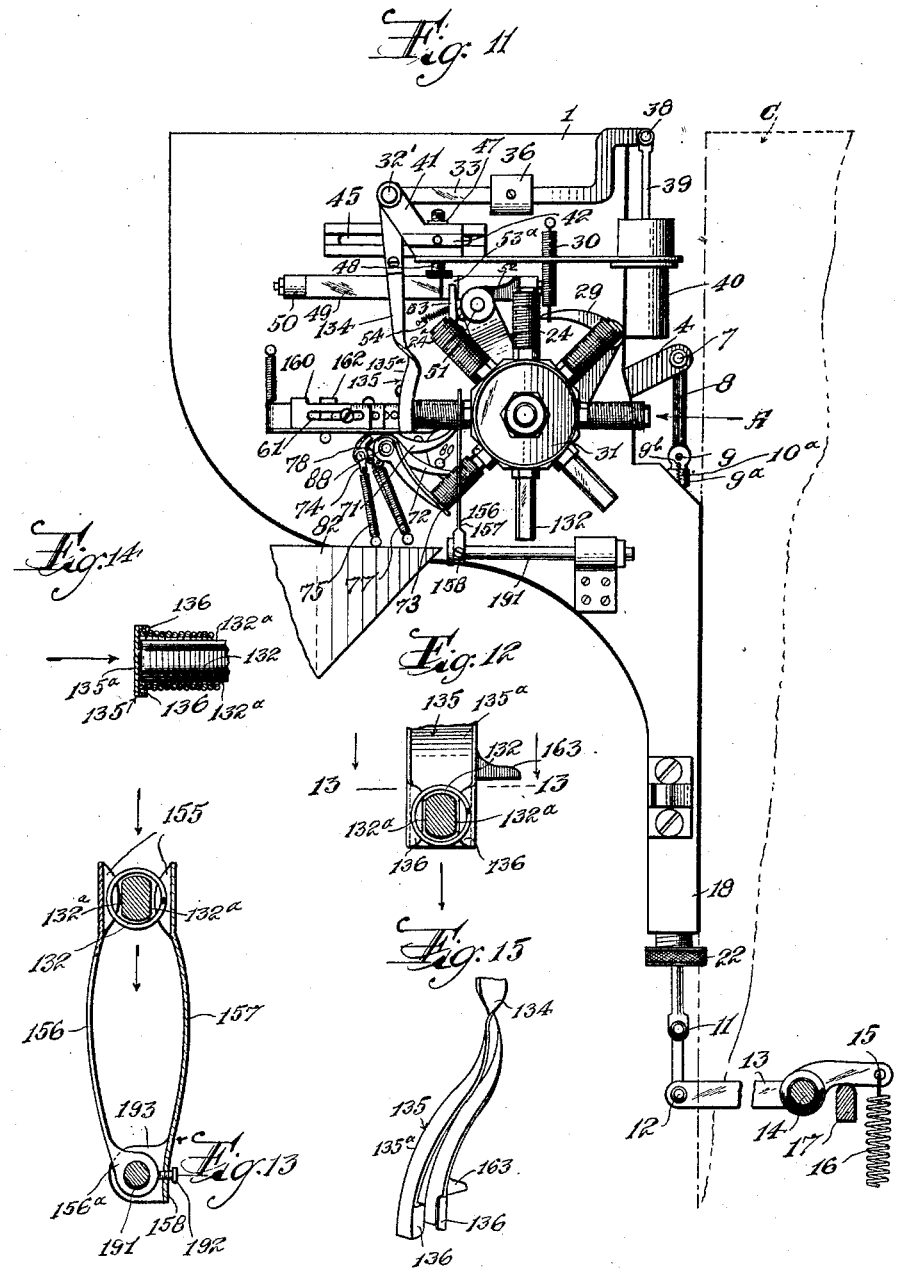

Patented May 21, 1929.

1,713,690

UNITED STATES PATENT OFFICE.

LORING P. CROSMAN, OF MAPLEWOOD, NEW JERSEY, ASSIGNOR TO MONROE CALCULATING MACHINE COMPANY, INC., OF ORANGE, NEW JERSEY, A CORPORATION OF DELAWARE.

SPRING TESTING AND ASSORTING MACHINE. REISSUED

Application filed February 23, 1928. Serial No. 256,272.

This invention relates to spring testing and assorting machines, and more particularly to devices for automatically comparing the tensile or compressive strength of coiled springs with a standard, and thereafter separating the faulty springs from those which meet the standard requirements.

In the manufacture of calculating, typewriting, and similar commercial machines it is necessary to use a number of spring actuated parts, and it is essential that the controlling springs for each part meet certain standard requirements as to tensile and compressive strength in order to insure the constant efficient operation of the machines. The controlling springs used in such machines are small, and usually are automatically made by machines of well known types. Such spring making machines are so designed that the greater portion of the coiled springs it produces fully meet the requirements as to strength; but such machines are not infallible and an appreciable percentage of the springs produced are faulty in that they are either too strong or too weak. Consequently, it is necessary that each spring be individually compared with a standard spring before being installed for use.

Heretofore, the comparison of springs with a standard has been accomplished by manual means, which obviously is a slow and inefficient process. In the manual testing of compression springs, the operator places the spring over a metal block having an integral upstanding rod which passes through the spring. A metal block of known weight and having a central aperture is slid over the rod and allowed to compress the spring under test. The rod is marked with tolerance marks and the amount of compression of the spring by the weight must come within the allowed tolerance, otherwise the spring is rejected as faulty.

It is an object of this invention to provide a device upon which springs may be automatically fed from a spring making machine, and automatically compared with a standard spring to determine their suitability for commercial use.

A further object is to provide a spring testing device having means by which faulty springs may be automatically separated from springs which meet the standard requirements.

A further object is to provide a mechanism by which the essential elements of a spring testing device may be intermittently actuated at the proper time.

A further object of the invention is to provide a mounting for a balancing lever which will permit the interchanging of the lever for use in connection with the testing of compression springs or tension springs.

A further object is to provide means for automatically moving a balancing lever intermittently in a direction opposite to the direction in which the lever is normally urged.

A further object is to provide a device for mounting a spring testing apparatus on a spring making machine so that the apparatus may be adjusted vertically and laterally in order to place certain elements of the apparatus and machine in exact alignment.

These and other objects are attained by the novel construction, combination and arrangement of parts hereinafter described and shown in the accompanying drawings, constituting a material part of this disclosure, and in which:

Figure 1 is an elevational view of the apparatus mounted on a spring making machine.

Figure 2 is a plan view of the apparatus.

Figure 3 is a front elevational view showing details of the apparatus.

Figure 4 is a cross-sectional view on the line 4—4 of Figure 3.

Figure 5 is a cross-sectional view on the line 5—5 of Figure 3.

Figure 6 is a rear elevational view of the apparatus.

Figure 7 is a side view of the apparatus.

Figure 8 is a cross-sectional view of the novel means for adjustably mounting the apparatus on a spring making machine.

Figure 9 is a cross-sectional view on the line 9—9 of Figure 8.

Figure 10 is a plan view of levers used in the assorting mechanism.

Figure 11 is a front elevational view of the device when used for the testing of tension springs.

Figure 12 is a detail view showing the extremity of an arm of the balancing lever used in Figure 11.

Figure 13 is a cross-sectional view of a gripping fork used in the testing of tension springs.

Figure 14 is a view showing the manner in which a tension spring is engaged by the arm shown in Figure 12.

Figure 15 is a perspective view of the testing arm used in the testing of tension springs.

Figure 16 is a view showing the swivel mounting of links in the actuating mechanism.

Figure 17 is a side view showing the positions of levers when a faulty spring is to be ejected from the device.

Figure 18 is a perspective view of U-shaped members used in the assorting mechanism.

Figure 19 is a side view showing the positions of levers when the spring under test meets the standard requirements.

Figure 20 is a side view showing the position of the levers for a faulty spring.

Referring to the drawings, Figures 1 and 2, a metal base plate 1, has passing therethrough a shaft 2, journalled in a sleeve 3, the latter being supported by the plate 1. Non-rotatably mounted on the shaft 2 is an arm 5, normally urged in a clockwise direction by the spring 6; and rotatably mounted on the shaft 2 is an arm 4, normally held in contact with arm 5 by the spring 6. The arms 4 and 5 are so shaped and positioned that the under edge of arm 5 is constantly in engagement with the upper edge of arm 4. Pivoted to the arm 4 at 7 is a link 8, which is pivoted at 9$^c$ to the head 9$^a$, the latter having a spherical recess to accommodate the rounded end 10$^a$ of the link 10, (see Fig. 16). The end 10$^a$ is maintained in contact with the head 9$^a$ by means of a pair of springs 10$^c$ attached, on opposite sides of the head 9$^a$ and the rod, to pins 9$^b$ and 10$^b$ respectively. The link 10 is pivoted at 11 to a third link, which in turn is pivoted at 12 to the lever 13 having a fulcrum at 14 and its opposite arm connected at 15 to a spring 16 which constantly tends to cause clockwise rotation of the lever 13, (as shown in Fig. 3). An arm 17, usually connected with the mechanism of a spring making machine, intermittently rotates the lever in a counterclockwise direction against the action of the spring 16. (Fig. 3.)

When the arm 17 moves upwards to cause the link 10 to move downward, carrying with it the arm 4, the spring 6 causes arm 5 to follow arm 4; and as soon as the force applied at 17 has ceased, the spring 16, causes the system to move the arm 4, and consequently the arm 5, upwards.

On the opposite side of plate 1, fixed to the shaft 2 and rotating therewith, is a bell crank 24, (Fig. 3) having mounted on its lower arm a pawl 25, spring pressed into engagement with the ratchet wheel 26, the latter being rotatably mounted on the shaft 2. When the lower arm of the bell crank moves upwards, the pawl 25 ratchets over the teeth of the wheel 26, and when the arm moves downwards, the pawl engages the teeth to rotate the wheel through a predetermined angle. Rotatably mounted on the shaft 2, and fixedly connected to the ratchet wheel 26 to rotate therewith, is a detent wheel 27, having arcuate peripheral recesses equal in number to the teeth on the ratchet wheel. The pin 28 on the lower arm of the bell crank 29, is constantly urged into engagement with the recessed wheel 27 by the spring 30, thereby preventing accidental rotation of the wheels in a counterclockwise direction, as shown in Figure 3.

Fixed to the ratchet wheel 26 and the detent wheel 27, is a wheel 31, having equally spaced radial projections 32, equal in number to the teeth on the ratchet wheel. It is upon these radial projections 32 that the springs to be tested are fed from a spring making machine, C, or otherwise at the point A, (Fig. 1). The ratchet wheel 26, the detent wheel 27, and the wheel 31, move as one, and the intermittent rotation of the ratchet wheel by the bell crank 24, causes a radial projection 32 to be intermittently placed in the proper position to receive a spring to be tested.

Mounted on the plate 1, (see Figs. 1, 2) is a small plate 44, having a groove 45, which accommodates the flanges 43 of the block 42, the latter having integral therewith a strip 46 which serves as a support for the dashpot 40. Integral with the block 42 are arms 41 which support a pin 32' upon which a two-arm balancing lever is pivoted. The vertical arm 34 of the lever has a ring-shaped extremity 35, (see Fig. 7) which is adapted to freely slide over radial projections 32. The horizontal arm 33, of the lever, carries a weight 36, which may be adjusted to vary the moment of force about the pivot 32', when springs of different strengths are to be used as standards. The arm 33 is upturned at 37, and has pivoted thereto at 38, a link 39, the latter being fixed to the piston of an oil dash-pot 40 to dampen the movements of the balancing lever when in operation.

Loosely positioned in an aperture in the block 42 is an internally threaded sleeve 47, accommodating the set screw 48, which is adjustable to limit the downward movement of arm 33. The head of the set screw 48 rests against a plate 49, which is pivotally mounted at 50 to lugs integral with the plate 1.

The plate 49 is provided with a cam 52 against which moves the roller 51, the latter being pivoted to the bell crank 24. When the upper arm of the bell crank 24 moves clockwise (Figure 1) the roller 51 moves against the cam 52 to tilt the plate 49, thereby causing the set screw 48 to raise arm 33. This movement causes the arm 34 to swing to the left, Figure 1, until the ring-shaped extremity 35 is free of radial projection 32. While the roller is tilting the plate 49, the catch 53, which is constantly urged by the compression spring 54 in a clockwise direction (Fig. 3), passes out of the slot 53ª, and engages the lower edge of plate 49 to maintain the plate 49 in a tilted position during the further clockwise movement of the bell crank 24. When the bell crank 24 moves in the opposite direction, the lug 24ª engages the catch 53 and forces it to a position where it snaps into slot 53ª, thus causing a quick return movement of the plate 49 to a horizontal position, and consequently a quick movement of the arm 34.

A pin 58 is fixed to the plate 1, and pivoted thereon are an outer U-shaped member 55, and an inner U-shaped member 56, the latter having a shortened leg 56ª (see Figs. 4, 18). The outer member 55 is provided with a ledge 55ª, which supports the slotted plates 59 and 61, provided respectively with the lugs 60 and 62 (Fig. 3). A portion of the outer leg of member 55 is equally divided by suitable marks 55ᵇ, and the slotted plates 59 and 61 are similarly marked. The plates 59 and 61 are clamped in adjusted positions by means of the screw 65 passing through the slots in the plates and through one of the apertures 64 in the outer leg of member 55. A spring 69 tends to constantly urge the member 55 against the pin 70 which limits its downward movement, while the upward movement of the member 55 is limited by the pin 83, (Fig. 4), and the upward movement of member 56 is limited by the pin 84. The extremity of the inner leg of member 56 is pointed as shown at 67, (Fig. 18) and the inner leg of member 55 carries a similar point 66, which is positioned slightly below the point 67.

Positioned near the U-shaped members 55, 56, is a pin 88, upon which are pivoted the levers 71, 72 and 73, the levers 71 and 73 being interconnected by a collar 87, (Fig. 10) and move as a unit. Levers 71 and 72 are adjacent each other, lever 72 being offset at 90 in order to leave a space between lever 72 and the flange 89 integral with lever 71 (Fig. 10).

Lever 72 has a cut-away portion to form a stop 81 (Fig. 19) which is adapted to engage the end 57 of the shortened leg 56ª. Pivoted on lever 72 is a pawl 74 controlled by a spring 75 and adapted to engage the hook 78 on lever 71, the latter being urged in a counter-clockwise direction by the spring 77, while lever 72 is controlled by spring 76. The upward movement of lever 71 is limited by the pin 85.

When the device is used in combination with a spring making machine, the apertured lugs 20 and 21, integral with the arm 18, (see Figs. 6, 7) are positioned between the apertured lugs 23, 24 integral with or fixed to the spring making machine. Referring to Figures 8 and 9, it will be noted that the apertures in lugs 20, 21 are larger than the aperture in lug 24, and lug 23 is internally threaded to accommodate the threaded adjusting nut 22. A sleeve 19 is positioned in the lugs, this sleeve having an eccentric reduced portion to fit in the aperture of lug 24, and the link 10 is slidably positioned in the sleeve 19. With the structure described it is possible to so adjust the position of the testing device that the radial projections 32 will intermittently stop in a position exactly in alignment with the longitudinal axis of a spring being fed from the spring making machine. If vertical adjustment is desired, the nut 22 is manipulated to either raise or lower the device; if lateral adjustment is desired the eccentric sleeve 19 is rotated and held in the adjusted position by the set screw 23ª.

In operation the springs to be tested are fed upon the radial projections at the point designated by the arrow A. The springs may be fed directly as they are emitted from a spring making machine C; they may be manually fed, or the feeding may be automatic by means of a suitable machine designed for that purpose.

In Figure 1, all of the projections 32, except the lower right hand two, carry springs. When the lever 17, which may be connected to the cutting mechanism of a spring making machine, is moved upwards, the rod 10 moves downward, allowing the arms 4 and 5 to move downward, and the bell crank 24 moves in a clockwise direction, (Fig. 1) with the pawl 25 thereon ratcheting over the teeth of ratchet wheel 26.

At the same time the roller 51 engages cam 52 to tilt the plate 49 to raise the set screw 48 to cause arm 34 to swing to the left (Fig. 1) free of the projection 32 presented in a horizontal position to the left; and compression spring 54 forces catch 53 clockwise, (Fig. 1); and when plate 49 has been tilted sufficiently, the catch 53 moves out of the slot and engages the lower surface of the plate 49 to hold it in the tilted position.

Assuming that the spring under test meets the standard requirements for compression, the pawl 68, during its upward movement, will engage the pointed extremity 66 of the outer U-member 55, and since the spring is a good one, the lug 63, (Fig. 7) on the ring-shaped extremity 35 of arm 34 will be positioned between the lugs 60 and 62, and offer no resistance to the tilting of member 55 by pawl 68; and when the member 55 is resisted in its tilting movement by pin 83, the pawl 68 snaps over the point 66 and the U-member 55 falls back into its normal position. Further clockwise movement of bell crank 24 tilts plates 49 and frees the arm 34 from the radial projection 32 as described above.

The spring has now been tested and it is ready to be ejected from the machine. When the force is removed from lever 17, the bell crank 24 will move counter-clockwise (Fig. 1), the pawl 25, engaging the ratchet wheel to rotate wheels 26, 27 and 31, and pin 28 will be cammed out of a peripheral recess in wheel 27 to engage the next recess which presents itself. The wheels are thus held against accidental rotation.

Stop 81 on lever 72 will remain in engagement with edge 57 of the short arm 56$^a$ of U-member 56. Pin 80 will not engage lever 71, shown in an elevated position (Fig. 1), since the pin passes just behind the flange 89, (Fig. 10) and when pin 80 approaches lever 72, it will be practically at the end of its downward movement, and consequently will have no effect on lever 72, and lever 73, integrally connected with 71. Lever 73 is essentially a gate lever, and as projection 32 carrying the tested spring moves downward, it will brush over gate lever 73, which will prevent the spring from falling off of the projection until reaches the position, B, (Fig. 1) which is the position for ejecting good springs.

In the meantime, a new spring has been presented in the horizontal position for testing, and roller 51 has gradually left the cam 52, and the lug 24$^a$ has forced catch 53 into the slot 53$^a$ to cause a quick return of plate 49. Arm 34 now moves to the right, (Fig. 1) and compresses the newly presented spring. This movement of arm 34 takes place immediately before pawl 68 starts to move upward.

Assume that the spring under test is faulty, and does not meet the requirements for compression. In this case, projection 63 on ring-shaped extremity 35 will not be positioned between the lugs 60, 62, but will lie above one of them, and, when dog 68 engages point 66, the projection 63 will prevent the tilting of member 55, causing dog 68 to snap over point 66 and engage point 67 of the inner U-member 56, to raise that member upward, the movement being limited by the pin 84. The tilting of arm 56$^a$ causes the edge 57 to be disengaged from stop 81, (Fig. 20) and the spring 76 rotates lever 72 counter-clockwise. During this movement the dog 74 snaps into engagement with hook 78 on lever 71, (Fig. 20), and lever 72 will be rotated until its movement is limited by pin 85. Levers 72 and 71 are now in a raised position substantially abreast of each other. On its down movement, pin 80 engages lever 72 in the curved portion 90, and forces it downward, which movement will cause 71 to move downward also, for dog 74 is pressing upward on hook 78 to cause clockwise rotation of 71, and incidentally a like rotation of gate lever 73, integral with lever 71. With further downward movement pin 80 engages flange 89 on lever 71 to cause further downward movement of that lever and gate lever 73. During these movements the projection 32 carrying the faulty spring has been moving downward and when it gets to a position about 45° from the horizontal, the faulty spring slides off into a receptacle 82, the gate lever 73 having been rotated clockwise until it does not obstruct the ejecting of the faulty spring as was the case with a good spring, (see Fig. 17). In the meantime, the short arm 56$^a$ of the U-member 56 has resumed its normal position and dog 74 has become disengaged from hook 78, and stop 81 is now in position to engage edge 57 again. A new spring has been presented for testing, and the parts are now in position to repeat either of the operations described above, depending upon whether the spring under test is good or faulty.

When it is desired to test the strength of tension springs, the balancing lever is reversed and one of the flanges 43 of the block 42 is slid into the groove 45 so that the weight 36, dashpot 40, and horizontal arm 33 are positioned to the right of the pivot 32', (Fig. 11). The vertical arm 134 of the balancing lever has a curved portion 135 concentric with the shaft 2 when the arm engages a spring to be tested. The curved portion 135 is provided with flanges 135$^a$, (Fig. 15) which serve as guides for springs from a position about 45° above the horizontal until the horizontal position is reached. (Fig. 11.) The arm carries at its extremity a pair of knife blades 136 adapted to engage one or two coils of the spring under test. The arm 134 is also provided with a lug 163, similar to lug 63, adapted to cooperate with lugs 160 and 162 for the purposes described in connection with the testing of compression springs.

In operation, the tension spring under test is guided to the horizontal position by the flanged curved portion 135 of arm 134, and when the horizontal position is reached the outer end of the spring is engaged by the knife blades 136, and the inner end of the spring is engaged by the blades 155 which are mounted on bowed arms 156, 157, properly positioned for the desired purpose.

As shown in Figure 13, arms 156, 157 are pivotally mounted on shaft 191, the arm 157 having apertured lateral ears positioned on opposite sides of arm 156, and a set screw 192 passes through arm 157 and forces arm 156 tightly against one side of the shaft 191, and at the same time causes the ears 193 to be pulled tightly against the other side of the shaft. The arms are thus held in a fixed position.

A tension spring being under test, the weight will cause arm 134 to swing to the left, (Fig. 11) until the lug 163 lies between the lugs 160 and 162, providing the spring meets the standard requirements. Of course, if the spring is faulty, the lug 163 will lie over either lug 160 or 162 to cause the assorting mechanism to operate in the manner described above for faulty compression springs.

The radial projections 132 have flattened sides 132$^a$ when the device is used to test tension springs.

After the spring has been compared, further counterclockwise rotation of member 31 causes the spring to be disengaged from the knife edges 136, and 155, the arms 156 and 157 being bowed in order that no obstruction will lie in the path of the projections 132 and the springs carried thereon.

The foregoing disclosure is to be regarded as descriptive and illustrative only, and not as restrictive or limitative of the invention, of which obviously embodiments may be constructed including many modifications without departing from the general scope herein indicated and denoted in the appended claims.

Having thus described my invention, what I claim as new and desire to secure by Letters Patent is:

1. In a device for comparing coiled springs with a predetermined standard, a member having a plurality of projections upon which springs may be fed, means for intermittently actuating said member, and a lever having an extremity adapted to engage a spring upon one of said projections.

2. A device for comparing the strength of coiled springs with a predetermined standard, comprising a member having a plurality of projections upon which springs may be fed, means for intermittently rotating said member in one direction, means for preventing the reverse rotation of said member, a lever having an extremity adapted to be moved into engagement with a spring on one of said projections, and means for urging the lever in the opposite direction.

3. A device for comparing the strength of coiled springs with a predetermined standard, said device comprising a shaft, a bell crank fixed to said shaft, a ratchet wheel rotatably mounted on the shaft, a pawl on said bell crank adapted to engage the teeth of the ratchet wheel to cause rotation in one direction, a member having a plurality of equally spaced radial projections upon which springs may be fed, said member being interconnected with said ratchet wheel to move therewith, a lever pivoted adjacent said member and having a horizontal arm upon which a weight is adjustably mounted, said lever having a vertical arm adapted to engage a spring on one of said projections.

4. In a device for comparing the strength of coiled springs with a predetermined standard, a base plate, a grooved plate fixed to said base plate, a flanged block slidable in said grooved plate, a lever pivotally supported by the block, said lever having a horizontal arm upon which a weight is adjustably positioned and a vertical arm having an extremity adapted to engage a coiled spring being compared.

5. In a machine for comparing the strength of coiled springs with a predetermined standard, a device for separating faulty springs from those which meet the standard requirements, said device comprising a gate lever adapted to serve as a guide for springs of the last mentioned type, and means to move the lever to an out-of-the-way position when the spring is faulty.

6. In a device for automatically comparing the strength of coiled springs with a predetermined standard, a member upon which springs may be directly fed, and means to intermittently actuate said member from a feeding towards a testing position.

7. In a device for comparing the strength of a coiled spring with a predetermined standard, a member having a projection upon which the spring to be compared is carried, a lever having means at its extremity to engage the spring being compared, and means to urge the lever in a direction to oppose the resistance of said spring, said last mentioned means being adjustable so that the force urging the lever will be dependent upon the predetermined standard.

8. In a device for comparing the strength of a coiled spring with a predetermined standard, a member upon which the spring being compared is carried, and means to engage the spring, said means being urged in a direction to oppose the resistance of the spring by a force dependent upon the predetermined standard.

9. In a device for comparing the strength of a coiled spring with a predetermined standard, a member upon which the spring being compared is carried, means to engage the spring being compared, said means being urged in a direction to oppose the resistance of the spring by a force dependent upon the predetermined standard, and means to indicate the amount of distortion of the spring by the first mentioned means.

10. In a device for comparing the strength of a spring with a predetermined standard, a guide member to prevent the ejection from the device of springs which meet the standard requirements until said spring has been moved to a predetermined position, and means to move said guide member to a different position so that faulty springs may be ejected before said predetermined position has been reached.

11. In a device for comparing the strength of a coiled spring with a predetermined standard, means for distorting a spring being compared by a force dependent upon the predetermined standard, and means for automatically ejecting said spring from the device at one of two predetermined positions, the point of ejection being dependent upon the amount the spring has been distorted by the first mentioned means.

12. In a device for comparing coiled springs with a predetermined standard, a shaft, means to oscillate the shaft, a member rotatably mounted on the shaft and having a plurality of projections upon which springs may be fed, a ratchet fixed to the member, and a pawl mounted on the shaft, said pawl engaging the ratchet to intermittently rotate the member.

13. In a device for comparing coiled springs with a predetermined standard, a member having a plurality of projections upon which springs may be fed, pawl and ratchet means to intermittently rotate said member, and a lever having an extremity adapted to engage a spring upon one of said projections.

14. In a device for comparing coiled springs with a predetermined standard, a member having a projection upon which a spring to be compared may be carried, a two-armed lever, one arm of the lever having an extremity adapted to engage a spring on the projection, the other arm of the lever being acted upon by a force urging the lever to rotate in one direction, and means to intermittently force the lever to rotate in the opposite direction.

15. A device for comparing the strength of coiled springs with a predetermined standard, comprising a member having a projection upon which springs may be fed, a lever having an extremity adapted to be moved into engagement with a spring on the projection, and means for intermittently urging the lever against the spring.

16. In a device for automatically comparing the strength of coiled springs with a predetermined standard, a member upon which springs may be directly fed, means to intermittently actuate said member from a feeding towards a testing position, and means for compressing the spring, said device being adapted to discharge the spring automatically.

This specification signed this 20th day of February, 1928.

LORING P. CROSMAN.